(12) United States Patent
Iguchi et al.

(10) Patent No.: US 7,793,563 B2
(45) Date of Patent: Sep. 14, 2010

(54) ERGONOMICALLY CONFIGURED STEERING HANDLEBAR APPARATUS FOR A VEHICLE

(75) Inventors: Hiroaki Iguchi, Saitama (JP);
Masaharu Omagari, Saitama (JP);
Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1063 days.

(21) Appl. No.: 11/107,460

(22) Filed: Apr. 15, 2005

(65) Prior Publication Data
US 2005/0229736 A1 Oct. 20, 2005

(30) Foreign Application Priority Data
Apr. 16, 2004 (JP) ............... 2004-121186

(51) Int. Cl.
*G05G 13/00* (2006.01)
*G05G 11/00* (2006.01)
*B62K 21/12* (2006.01)
(52) U.S. Cl. .................. 74/488; 74/484 R; 74/551.8
(58) Field of Classification Search ............... 74/484 R, 74/488, 473.3, 551.1, 551.8, 501.6, 501.2
See application file for complete search history.

(56) References Cited

U.S. PATENT DOCUMENTS

| | | | | |
|---|---|---|---|---|
| 1,919,470 A | * | 7/1933 | Kirby | 261/46 |
| 3,845,847 A | * | 11/1974 | Camp | 477/204 |
| 4,213,513 A | | 7/1980 | Beck | |
| 4,256,197 A | * | 3/1981 | Kiser, Jr. | 180/335 |
| 4,526,056 A | | 7/1985 | Yamanaka et al. | |
| 4,565,909 A | * | 1/1986 | Yashima et al. | 200/61.85 |
| 4,838,113 A | | 6/1989 | Matsushima et al. | |
| 5,829,312 A | | 11/1998 | Berg et al. | |
| 6,363,812 B1 | * | 4/2002 | Yamamura | 74/551.8 |
| 2002/0189565 A1 | | 12/2002 | Okuma et al. | |
| 2003/0000333 A1 | * | 1/2003 | Kawakami | 74/502.2 |
| 2003/0094064 A1 | * | 5/2003 | Dal Pra' | 74/502.2 |

FOREIGN PATENT DOCUMENTS

| | | |
|---|---|---|
| JP | S61-287886 A | 12/1986 |
| JP | 11-345529 A | 12/1999 |
| JP | 2002-371944 | 12/2002 |
| WO | WO0050295 | 8/2000 |

* cited by examiner

Primary Examiner—Thomas R Hannon
Assistant Examiner—Justin Krause
(74) Attorney, Agent, or Firm—Carrier, Blackman & Associates, PC.; William D. Blackman; Joesph P. Carrier

(57) ABSTRACT

A steering handlebar apparatus for a vehicle includes a rod-shaped steering handlebar having a hand grip at a distal end thereof, and also includes both a clutch lever and a hot start lever mounted thereon at a position proximal to the hand grip. A switch holder for holding various switches is mounted to the steering handlebar at a position proximal to the hand grip. The hot start lever is journaled on the lower surface of the switch holder so that the user can operate the hot start lever with the thumb of the hand which is holding the hand grip, and can simultaneously turn off the clutch lever with other fingers of the same hand. The inventive arrangement provides a steering handlebar apparatus for a vehicle which facilitates simultaneous operation of a handle lever and a hot start lever using the hand which is holding a hand grip of a steering handlebar.

10 Claims, 4 Drawing Sheets

ERGONOMICALLY CONFIGURED STEERING HANDLEBAR APPARATUS FOR A VEHICLE

CROSS-REFERENCE TO RELATED APPLICATIONS

The present invention claims priority under 35 USC 119 based on Japanese patent application No. 2004-121186, filed on Apr. 16, 2004. The subject matter of this priority document is incorporated by reference herein.

BACKGROUND OF THE INVENTION

1. Field of the Invention

The present invention relates to an improved steering handlebar apparatus for a vehicle, in which the steering handlebar includes a clutch lever and a hot start lever mounted to a rod-shaped steering handlebar of a motorcycle, a buggy, or the like. The steering handlebar has hand grips at both distal ends thereof, and the clutch lever and hot start lever are mounted close together on the handlebar, at positions proximal to the left hand grip.

2. Background of the Invention

Conventional steering handlebars, for two-wheeled vehicles such as motorcycles and scooters, and for four-wheeled vehicles such as all-terrain vehicles or buggies, generally include hand grips at both distal ends thereof. In such vehicles, it is known to provide the clutch lever and hot start lever mounted close together on the handlebar, proximal to the left hand grip. This type of steering handlebar configuration is shown, for example, in JP-A-2002-371944.

The hot start lever on the steering handlebar apparatus as described above is operated, especially when hot-starting an engine, to open a hot start valve of a carburetor, for supplying fresh air to the engine to temporarily attenuate or "lean out" the air-fuel mixture, thereby improving hot-startability of the engine.

The engine may be started with the vehicle's transmission clutch disengaged, by operating a clutch lever. However, since in the related art, the hot start lever is mounted to the clutch lever in the steering handlebar apparatus, a certain amount of skill is required for a user to simultaneously operate both the clutch lever and the hot start lever with one hand, which is also holding a hand grip of the steering handlebar.

In view of such circumstances, it is an object of the present invention to provide an improved steering handlebar apparatus having an improved ergonomic design, which facilitates simultaneous operation of a clutch lever and a hot start lever by the hand of a user which is also holding a hand grip of a steering handlebar.

SUMMARY OF THE INVENTION

In order to achieve the object described above, the present invention provides an improved steering handlebar apparatus for a vehicle, in which the apparatus includes a clutch lever and a hot start lever mounted to a rod-shaped steering handlebar having a hand grip at a distal end thereof. The clutch lever and the hot start lever are ergonomically mounted at positions close to the hand grip. The invention is first characterized in that a switch holder, for holding various electrical switches, is mounted to the steering handlebar at a position proximal to the hand grip and adjacently thereto. The hot start lever is pivotally mounted to the switch holder, via a pivot connection, so that the user can operate the hot start lever using a thumb of his/her hand which is holding the adjacent hand grip.

The various switches mounted on the switch holder include a lighting switch 21, a dimmer switch 22 and a kill switch 23, described below.

In addition to the first characteristic, the present invention is secondly characterized in that the hot start lever is disposed on the switch holder, at a position below the steering handlebar, so that the user can push the lever with a thumb of his/her hand which is also holding the adjacent hand grip.

In addition to the second characteristic, the present invention is thirdly characterized in that the pivot connection, for the hot start lever, is disposed at a position forward of, and close to the longitudinal centerline of the steering handlebar, with respect to a push surface of the hot start lever.

According to the first characteristic of the present invention, when hot-starting the engine with the transmission in gear, the user can simultaneously and easily operate both the hot start lever with his/her thumb, and operate the clutch lever with the other fingers of his/her hand which is holding the adjacent hand grip. As a result, the hot-start operation of the engine can be easily performed, without requiring advanced skill or dexterity.

According to the second characteristic of the present invention, because the hot start lever is ergonomically disposed on the switch holder at a position below the steering handlebar, when the user stretches his/her thumb in a state of holding the hand grip, his/her thumb naturally reaches the hot start lever. As a result, the pushing operation of the hot start lever by his/her thumb can be performed extremely easily.

According to the third characteristic of the present invention, because the pivot connection for the hot start lever is disposed forwardly of, and close to the longitudinal centerline of the steering handlebar, with respect to a push surface of the hot start lever, when the hot start lever is rotated by the pushing operation of the user's thumb, the push surface rationally and gradually approaches his/her index finger of the hand which is holding the handlebar hand grip. As a result, the pushing operation can be performed extremely easily.

Modes for carrying out the present invention are explained below by reference to a selected illustrative embodiment of the present invention, shown in the attached drawings. The above-mentioned object, as well as other objects, characteristics and advantages of the present invention will become apparent from the detailed description of the embodiment of the invention presented below, in conjunction with the attached drawings.

DETAILED DESCRIPTION OF THE INVENTION

Referring now to attached drawings, modes for carrying out the present invention will be described based on a number of selected illustrative embodiments of the present invention.

In the description below, the front, rear, left and right are directions based on the corresponding directions in a vehicle, from the perspective of a vehicle operator seated thereon.

Figure 1:
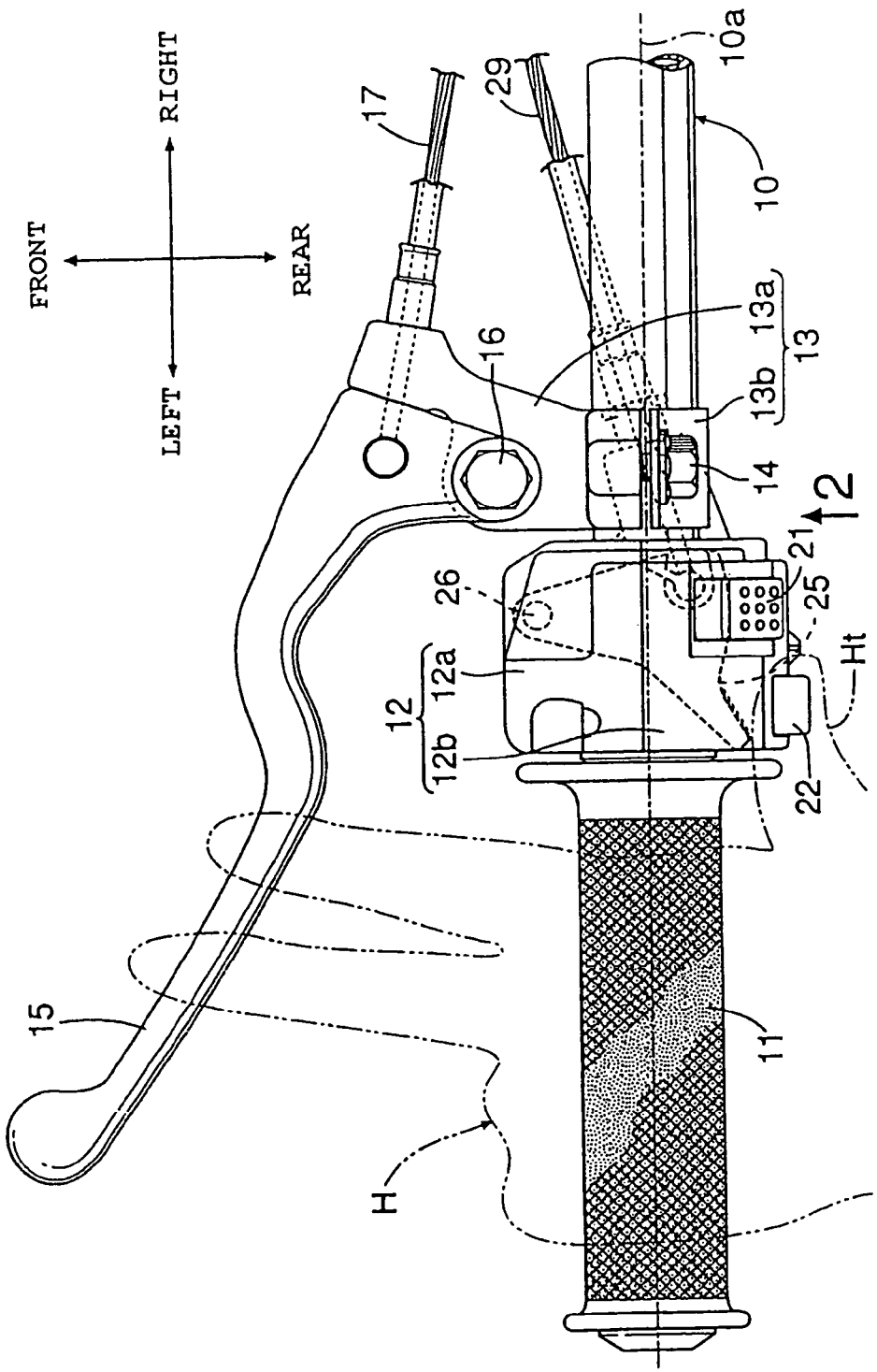
FIG. 1 is a top plan view of a steering handlebar apparatus for a vehicle according to a selected illustrative embodiment of the present invention, showing a hand grip mounted at the left distal end of the steering handlebar, and showing the switch holder mounted proximally to the hand grip, and the clutch lever mounted proximally to the switch holder.
Figure 2:
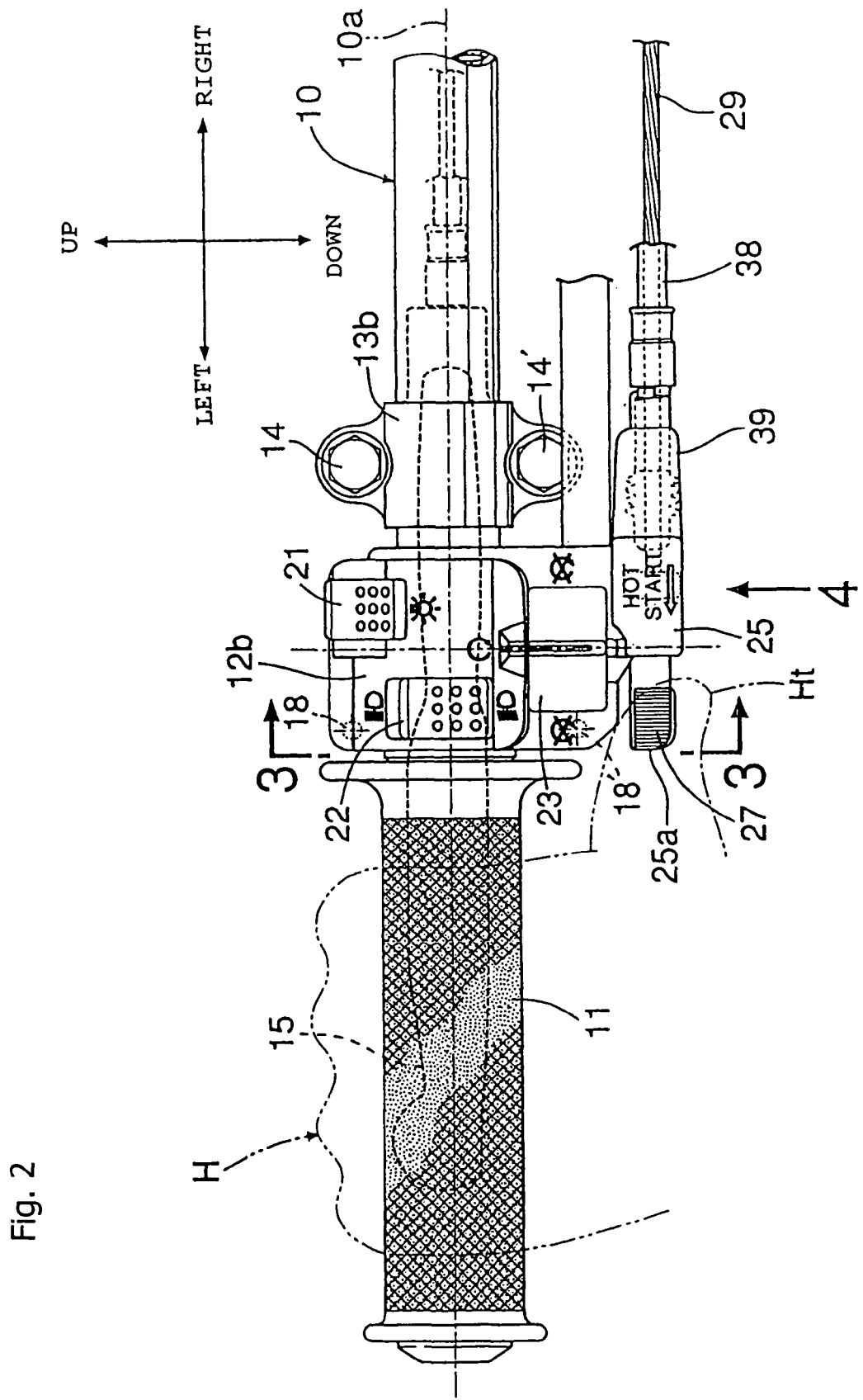
FIG. 2 is a rear plan view of the steering handlebar apparatus for a vehicle according to an embodiment of the present invention, viewed in the direction of arrow 2 in FIG. 1.

In FIG. 1 and FIG. 2, a reference sign H designates the hand of a user hand gripping the left hand portion of a steering handlebar 10 used for an all-terrain buggy, a motorcycle, or the like. A cylindrical hand grip 11, formed of resilient material such as rubber, is fitted on the outer periphery of the steering handlebar 10 at the left distal end thereof. The steering handlebar 10 is also provided with a switch holder 12 mounted at a position proximal, and immediately adjacent, to the hand grip 11. A lever holder 13 is mounted to the steering handlebar 10 at a position proximal, and immediately adjacent, to the switch holder 12. Thus, the switch holder 12 is mounted on the steering handlebar 10 between the hand grip 11 and the lever holder 13.

The lever holder 13 includes a front lever holder half 13a that is fitted to the front half periphery of the steering handlebar 10, and a rear lever holder half 13b that is fitted to the rear half periphery thereof. Both lever holder halves 13a, 13b are connected to each other by a pair of upper and lower connecting bolts 14, 14' so as to clamp the steering handlebar 10 therebetween. A clutch lever 15, disposed forwardly of the hand grip 11, is mounted to the front lever holder half 13a via a pivot 16. A clutch actuator wire 17, extending from a release member of a clutch (not shown) in a transmission system of the engine, is connected to the clutch lever 15, so that when the clutch lever 15 is pulled toward the hand grip 11, the clutch actuator wire 17 is pulled and hence the clutch can be disengaged.

Figure 3:
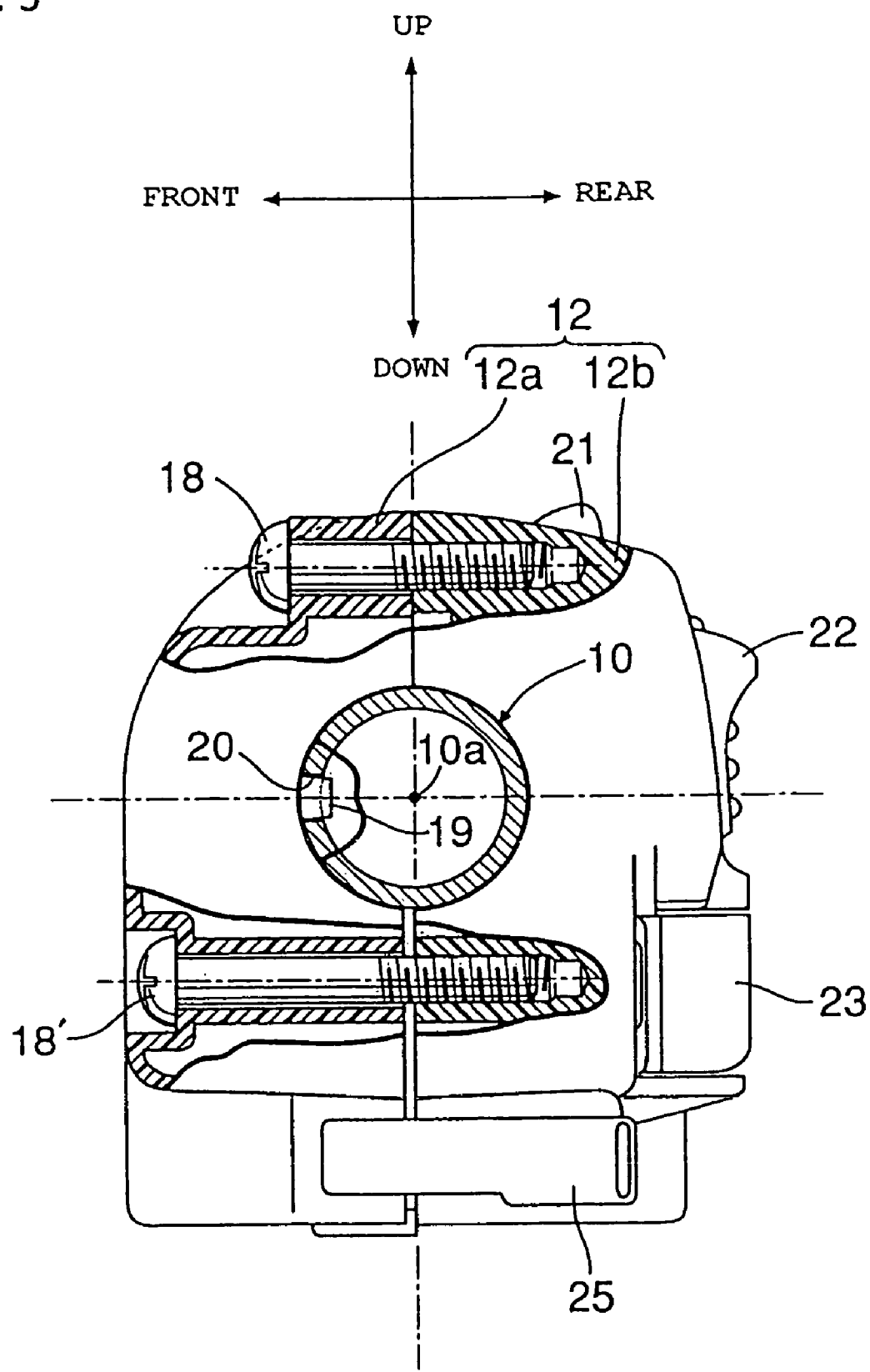
FIG. 3 is an end plan detail view, partly broken away and partly in cross-section, of the handlebar and switch holder of FIGS. 1-2, viewed in the direction of line 3-3 in FIG. 2.

As shown in FIG. 3, the switch holder 12 includes a front switch holder half 12a, to be fitted on the front half periphery of the steering handlebar 10, and a rear switch holder half 12b to be fitted on the rear half periphery thereof. Both of the switch holder halves 13a, 13b are connected to each other by a pair of upper and lower connecting bolts 18, 18' so as to clamp the steering handlebar 10 therebetween. A projection 19 is formed on an inner surface of the front switch holder half 12a so as to project radially inwardly from the inner surface. The projection 19 provides for registration of the switch holder 12 on the steering handlebar 10, and is fitted into a positioning hole 20 formed on the steering handlebar 10.

Referring again to FIG. 1 and FIG. 2, a plurality of switches are disposed on the switch holder 12. In the illustrated embodiment, the switch holder 12 includes a lighting switch 21 for controlling turning ON and OFF of a headlamp from above, a dimmer switch 22 for switching the direction of a beam from the headlamp between a high-beam and a low-beam, and a kill switch 23, for stopping the operation of the engine by deactivating an ignition circuit of the engine in sequence from above. However, switch holder 12 is not limited to the switches disclosed herein, and other switches, and/or combinations thereof, may be disposed on switch holder 12.

Figure 4:
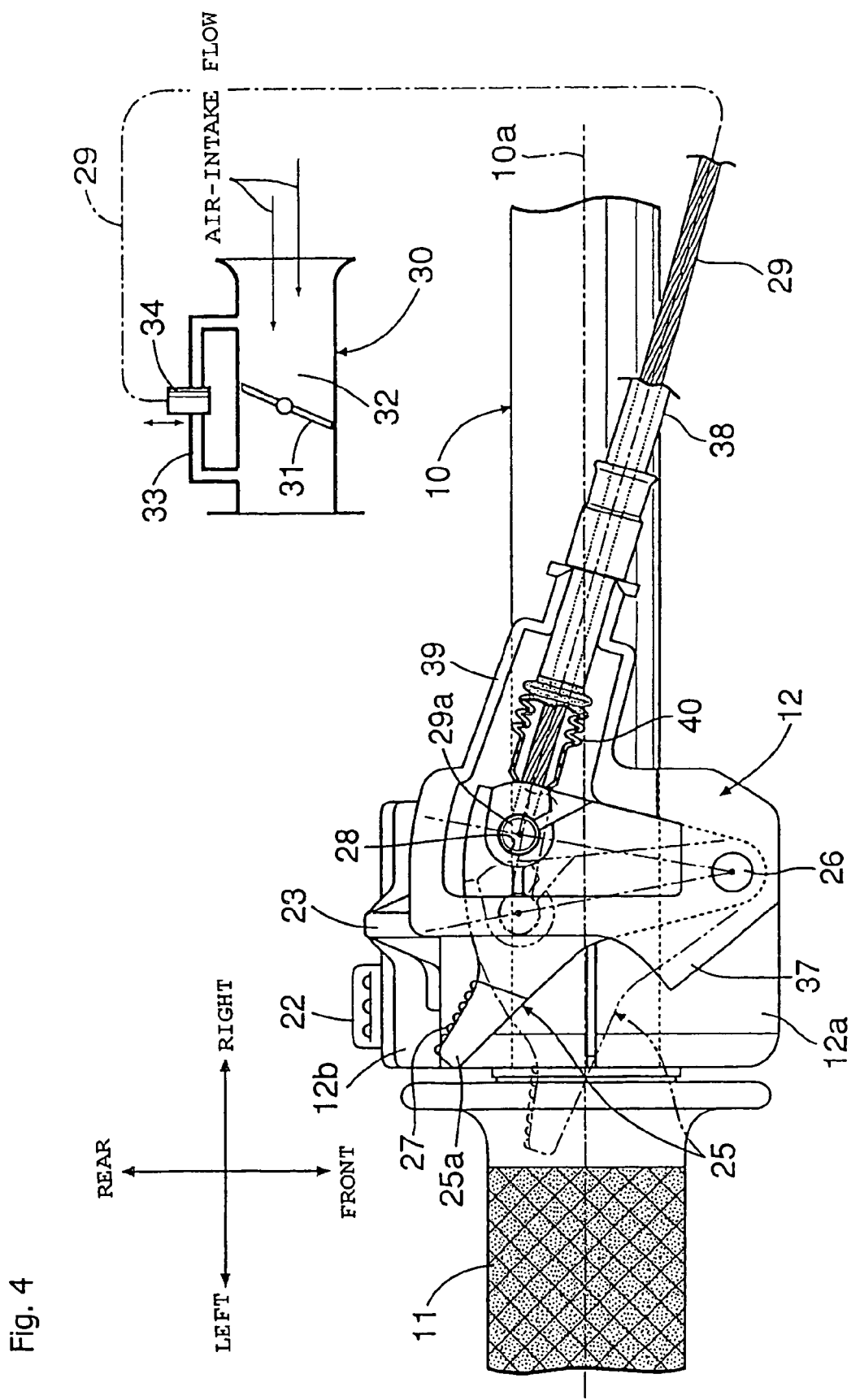
FIG. 4 is an enlarged bottom plan view of the steering handlebar apparatus for a vehicle according to an embodiment of the present invention, viewed in the direction of arrow 4 in FIG. 2, and also schematically illustrating part of the vehicle carburetor.

In FIG. 1, FIG. 2, and FIG. 4, a hot start lever 25 is mounted on the lower surface of the front switch holder half 12a, which is located on the lower side of the steering handlebar 10. The hot start lever 25 is mounted on the switch holder 12 via a pivot connection 26, so as to be capable of rotating about the vertically oriented pivot connection 26 and moving in a substantially horizontal plane. As is clearly shown in FIG. 4, the pivot connection 26 is disposed forward of an axis line 10a of the steering handlebar 10, and the hot start lever 25 is located behind the axis line 10a of the steering handlebar 10. The hot start lever 25 has a distal portion 25a projecting obliquely toward the rear and toward the hand grip 11. A push surface 27, provided with slip resistance, is formed on the rear surface of the distal portion 25a. Therefore, the pivot connection 26 is disposed on the opposite side of the longitudinal centerline of the steering handlebar 10 from the push surface 27 of the hot start lever 25, providing a relatively long lever arm for the hot start lever, to promote easy operation thereof.

The hot start lever 25 includes a wire connecting hole 28 at the midsection thereof, between the pivot connection 26 and the distal portion 25a. A connecting terminal 29a, located at a first end of a hot start wire 29, is fitted and connected thereto.

As shown in FIG. 4, a carburetor 30 of the engine includes an air-intake channel 32 opened and closed by a throttle valve 31 and continuing to an air-intake port of the engine. An auxiliary air channel 33 is connected to the air-intake channel 32 bypassing the throttle valve 31. A hot start valve 34 is provided in the auxiliary air channel 33 so as to open and close the same, and the other (second) end of the hot start wire 29 is connected to the valve 34. Therefore, by pushing the push surface 27 and thereby moving the hot start lever 25 toward the hand grip 11, the hot start wire 29 can be pulled, and the hot start valve 34 can be opened.

The front switch holder half 12a is formed with a guide wall 37 which covers the lower surface of the hot start lever 25 to guide the rotation thereof. The guide wall 37 is provided with an outer tube supporting portion 39 for retaining the outer tube 38 of the hot start wire 29. An elastic boot 40 is provided between the end of the outer tube 38 and the hot start lever 25. The elastic boot 40 covers an end portion of the hot start wire 29.

Subsequently, the operation of the present embodiment will be described.

When operation of the engine is stopped while the engine is hot, and then the engine is started again while it is still hot, the user first pushes the push surface 27 of the hot start lever 25 using a thumb Ht of the hand H which holds the hand grip 11. This action rotates the lever 25 toward the hand grip 11, whereby the hot start valve 34 is opened. When the user cranks the engine in this state using a starting motor, new air which does not contain fuel is taken into the downstream side of the air-intake channel 32 via the auxiliary air channel 33 even when the throttle valve 31 is closed to an idling position. Accordingly, the air-fuel mixture supplied from the air-intake channel 32 to the engine is suitably attenuated, and hence the engine can be started easily while avoiding an excessive concentration of the air-fuel mixture.

In particular, since the hot start lever 25 is journaled on the lower surface of the switch holder 12, which is located on the lower side of the steering handlebar 10, and since the hot start lever is provided with the push surface 27 pushed by the thumb Ht, the thumb Ht reaches the hot start lever 25 spontaneously by stretching the thumb Ht of the hand H which is holding the hand grip 11. Thus, the pushing operation of the hot start lever 25 by the thumb Ht can be performed extremely easily.

Since the pivot connection 26 of the hot start lever 25 is disposed at a position forwardly of, and closer to, the longitudinal center of the steering handlebar 10 with respect to the push surface 27 of the hot start lever 25, when the hot start lever 25 is rotated by the pushing operation by the user's thumb, the push surface 27 rationally approaches his/her index finger of the hand H which is holding the handle hand grip 11 gradually, whereby the pushing operation can be performed even more easily.

When starting the engine with the transmission is at a gear position other than neutral, it is necessary to disconnect the clutch. In such a case, the user can simultaneously and easily both push-operate the hot start lever 25 with his/her thumb Ht and turn off the clutch lever 15 with other fingers of the same hand H which is holding the hand grip 11 as shown in FIG. 1, whereby the hot-start operation of the engine can be performed extremely easily without necessity of excessive manual dexterity or skill.

While a working example of the present invention has been described above, the present invention is not limited to the working example described above, but various design alterations may be carried out without departing from the spirit and scope of the present invention as set forth in the claims.

What is claimed is:

1. A steering handlebar apparatus for a vehicle, comprising:
   a rod-shaped steering handlebar;
   a hand grip disposed at a distal end of the handlebar,
   a clutch lever and a hot start lever respectively mounted to the steering handlebar, at positions sufficiently close to the hand grip such that during operation of the vehicle, said clutch lever and said hot start lever are simultaneously reachable and operable;
   a switch holder for holding various switches, said switch holder being mounted to the steering handlebar at a position proximate the hand grip,
   wherein the hot start lever is rotatably mounted to the switch holder via a pivot connection;
   wherein the hot start lever comprises a wire connecting hole, a connecting terminal and a hot start wire, said connecting terminal located at a first end of the hot start wire; and
   wherein the hot start lever is operatively connected to a carburetor having an air intake channel formed therethrough and a throttle valve disposed in the air intake channel, the carburetor also having an auxiliary air channel formed therethrough for selectively bypassing the throttle valve, the auxiliary air channel having a hot start valve provided therein for selectively blocking air flow therethrough.

2. The steering handlebar apparatus for a vehicle according to claim 1, wherein the hot start lever is disposed on the switch holder at a position below the steering handlebar.

3. The steering handlebar apparatus for a vehicle according to claim 2, wherein the pivot connection between the hot start lever and the switch holder is disposed at a position forward of, and on the opposite side of a longitudinal centerline of the steering handlebar with respect to an actuation surface of the hot start lever.

4. The steering handlebar apparatus for a vehicle according to claim 1, wherein the hot start lever is mounted to the switch holder such that the hot start lever rotates in a substantially horizontal plane.

5. The steering handlebar apparatus for a vehicle according to claim 1, wherein the hot start lever further comprises a projection which projects obliquely toward a rear of the vehicle and toward the hand grip, and wherein a push surface is formed on the projection for receiving an actuation force from the user.

6. The steering handlebar apparatus for a vehicle according to claim 5, wherein the pivot connection is positioned forwardly of, and closer to, a longitudinal centerline of the steering handlebar than the push surface.

7. The steering handlebar apparatus for a vehicle according to claim 1, wherein the clutch lever is mounted to the steering handlebar proximal to the switch holder, such that the hot start lever is disposed between the hand grip and the clutch lever.

8. The steering handlebar apparatus for a vehicle according to claim 1, wherein the clutch lever is mounted to the steering handlebar so as to be disposed in front of the steering handlebar, and wherein the hot start lever is mounted to the steering handlebar so as to be disposed below the steering handlebar.

9. A steering handlebar apparatus for a vehicle, comprising:
   a steering handlebar;
   a hand grip disposed at a distal end of the handlebar,
   a clutch lever and a hot start lever respectively mounted to the steering handlebar, and
   a switch holder for holding various switches, said switch holder being mounted to the steering handlebar at a position proximate the hand grip, said switch holder being formed with a guide wall which covers a lower surface of the hot start lever and guides rotation of the hot start lever,
   wherein the hot start lever is rotatably mounted to the switch holder via a pivot connection,
   wherein the pivot connection is formed on a lower portion of the switch holder,
   said hot start lever is disposed on a lower surface of said switch holder,
   the lower surface is disposed at a position below said steering handlebar; and
   wherein the hot start lever is operatively connected to a carburetor of an engine, said carburetor having an air intake channel formed therethrough and a throttle valve disposed in the air intake channel, the carburetor also having an auxiliary air channel formed therethrough for selectively bypassing the throttle valve, the auxiliary air channel having a hot start valve provided therein for selectively blocking air flow therethrough.

10. The steering handlebar apparatus for a vehicle according to claim 9, wherein the hot start lever comprises a projection which projects obliquely toward the rear of the vehicle and toward the hand grip, and wherein a push surface is formed on the projection for receiving an actuation force,
   the pivot connection between the hot start lever and the switch holder is disposed at a position forward of, and on the opposite side of a longitudinal centerline of, the steering handlebar with respect to said push surface of the hot start lever,
   said push surface of the hot start lever is disposed at a position forward of the switches, and
   said push surface is disposed at a position proximate to the hand grip.

* * * * *